United States Patent Office 3,489,516
Patented Jan. 13, 1970

3,489,516
ART OF MAKING SILICA PARTICLES
Herman F. Kummerle, Toledo, Ohio, assignor to Owens-Illinois, Inc., a corporation of Ohio
No Drawing. Filed Oct. 19, 1966, Ser. No. 587,647
Int. Cl. C01b *33/18;* B01j *11/44*
U.S. Cl. 23—182                                    19 Claims

ABSTRACT OF THE DISCLOSURE

Silica glass particles are economically and advantageously formed by polymerizing silicic acid in a dispersed organic phase in an aqueous medium. The reaction is accelerated by the use of a catalytic amount of a fluoride. By the use of certain volatile liquid organic compounds as the dispersed phase, the glass particles formed during polymerization may be collected and the volatile liquid organic compound recovered thereafter and used again to form further silica particles.

---

This invention relates broadly to the art of making silica particles. More particularly, it is concerned with the art of forming small particles, including beads and bead-like particles as well as irregularly shaped particles or agglomerates thereof, from water-soluble alkali-metal silicates, specifically sodium silicate (water glass). The scope of the invention includes both composition and method features.

Compounds of the formula $xNa_2O \cdot ySiO_2$ are named by the rules of the International Union of Pure and Applied Chemistry as sodium $(x:y)$ silicates. The profound effects of traces of oxides of polyvalent metals make it difficult to define exactly the ratios of $x:y$ that are present in the water-soluble silicates. However, it is generally believed that a value of $x/y$ greater than 0.24 characterizes the water-soluble sodium silicates, and that a similar generalization holds for the commercially less important silicates of potassium, lithium, rubidium, and cesium. The soluble sodium silicates have been used commercially for many different purposes and in many different applications including, for example, detergents; adhesives; in cements, sizes, and coatings; in various material-treating applications such as in the treatment of water, textiles, concrete, etc.; in oil-well drilling compositions and applications; in the manufacture of roofing granules; and for various other purposes and applications.

Silica beads have found application as catalysts or catalyst supports in fixed, moving, or fluidized-bed systems for hydrocarbon conversion in the petroleum industry. Consequently, methods have been provided for the preparation of silica beads from water-soluble silicates. The processes usually involve the preparation of a suspension of acidified, aqueous sodium silicate in a water-immiscible medium such as a liquid hydrocarbon. The resulting suspension is maintained until the spheres have hardened, after which they are separated from the liquid medium in which they have been formed, sorted, and washed free of undesirable contaminants.

An improvement in prior processes of forming uniformly small, solid, spherical beads from alkali-metal silicates, specifically sodium silicate, is disclosed in U.S. Patent No. 3,258,311, dated June 28, 1966, of Alfred J. Burzynski and Robert E. Martin, the assignee thereof being formerly the name of the corporation to which the instant invention is assigned.

It is a primary object of the present invention to provide new silica particles useful as catalysts and for other purposes.

Another main object of the invention is to provide a method of producing silica particles in spherical or approximately spherical form (including solid particles of silica as well as irregularly-shaped particles or agglomerates thereof), whereby yields are improved and the product is obtained in a shorter time interval and at lower costs than heretofore has been possible.

A further object of the invention is to provide a method of the general character described in the preceding paragraph using a water-soluble alkali-metal silicate (or mixtures thereof), and specifically water-soluble sodium silicate, as a starting material.

Other objects of the invention will be apparent to those skilled in the art from the following more detailed description and from the appended claims.

The present invention is based on my discoveries in two different general areas involved in the production of silica particles from water glass.

The first area involves the use, in a particular environment, of a particular type of silicic acid polymerization catalyst which permits greater leeway with regard to the time, temperature, and acid concentration required to prepare silica particles, and which accelerates the completion of polymerization whereby the particles are produced in higher yields in shorter reaction periods than heretofore has been possible. The catalyst employed is the fluoride ion.

Although there are references in the scientific literature to the catalyzing effect of the fluoride ion on silicic acid polymerization (e.g., "The Colloid Chemistry of Silica and Silicates," Iler, p. 48 ff, Cornell University Press), there is no reference to its use in conjunction with silicic acid dispersed in a particle-forming, specifically bead-forming, organic phase and which permits the production of silica particles at a low concentration of excess acid.

Elam in U.S. Patent No. 2,516,967 discloses the use of fluoride ions to catalyze the formation of silica gel spheroids. In the disclosed process a hydrosol capable of rapid gelation, such as silica hydrosol, is introduced in the form of globules into a "liquefied composition," the temperature of which is maintained below the boiling point of the hydrosol, and is kept at that temperature until gelation occurs. The "liquefied composition" of Elam may be any compound, mixture of compounds, or heterogenous material that is substantially immiscible with water and which has a melting point higher than the temperature of the hydrosol that is being introduced therein, but this melting point is below the boiling point of the hydrosol. Examples of Elam's water-immiscible "liquefied compositions" are normally solid organic acids of high-molecular-weight such as myristic, palmitic and stearic acids; alcohols such as cetyl and piperonyl alcohols; aldehydes such as phthaldehyde and vanillin; ketones such as benzophenone and fluorenone; hydrocarbons such as biphenyl, naphthalene, dibenzyl and paraffin wax having a melting point between about 120° F. and about 180° F.; and halogenated, nitrated, and both halogenated and nitrated derivatives of aromatic hydrocarbons. None of the "liquefied compositions" employed by Elam are normally liquids such as are those employed in practicing the present invention.

The use of a very small amount of a fluoride ion derived from, for example, a water-soluble fluosilicate (e.g., $Na_2SiF_6$, $K_2SiF_6$, and/or other alkali-metal fluosilicate) permits the production of silica beads at a low acid concentration, for instance at a pH of about 2. An example of this is the production of silica beads from an aqueous solution of sodium silicate using the following formulation:

Sodium silicate solution (6.32% $SiO_2$; 1.75% $Na_2O$)
　ml__ 50
1% aqueous sulfuric acid _____ml__ 150
Tergitol NPX [1] _____ml__ 10
Sodium fluosilicate _____mg__ 6

[1] Tergitol NPX is understood to be a polyether of nonylphenol containing an average of about 10.5 —$CH_2CH_2O$— groups.

The beads are produced by agitating the above-described reaction mass for about 1 hour at 85° C.

Using a "normal" silica bead recipe and wherein there is employed 150 ml. of a 10% (instead of 1%) aqueous solution of sulfuric acid and approximately the same amount of sodium fluosilicate so facilitates completion of the bead-producing reaction that a substantially improved yield is obtained in the same length of the reaction period as when no sodium fluosilicate is used.

The second of the two different general areas involved in the instant invention is my discovery in the area of recoverable organic solvents that are useful in the production of silica particles, specifically silica beads or bead-like particles, produced in conjunction with the use of a flouride ion as a polymerization catalyst.

In the discussion of the first general area of investigation leading to the instant invention, it was shown that the flouride ion, even in a conventional process wherein a typical organic surfactant is employed, aids in the production of silica beads in an improved yield both at low and high concentrations of sulfuric acid at a reaction temperature of 85° C. For catalytic and other applications of silica beads, such surfactants must be removed from the beads by oxidation. When this is done, economical recovery, e.g., by distillation, of organic compounds of the kind heretofore used or suggested for use is precluded.

From the investigations made in this area, it was discovered that there are certain organic materials which can be caused to provide a dispersed phase in which the silicic acid is soluble and wherein it can polymerize and/or continue to polymerize to assume the shape of the dispersed phase. This extends the field of organic materials that can be used in the production of silica particles to those that can be recovered by simple distillation technique and thus provides important and material economic advantages in the manufacture of inorganic oxide particles, especially beads or bead-like particles comprised or composed essentially of silica, for catalytic and other applications.

It was also surprisingly and unobviously found that such a solvent, together with the use of a flouride ion derived from, for example, sodium fluosilicate, makes possible the production of silica particles at ambient temperature (i.e., about 20°–30° C., specifically about 25° C.). Examples of organic solvents that are thus capable of functioning as an organic dispersed phase in the production of silica particles are n-hexyl Cellosolve (ethylene glycol mono-n-hexyl ether), n-hexyl Carbitol (diethylene glycol mono-n-hexyl ether) and isopropanol. When using an organic solvent such as isopropanol, the solubility properties are achieved by salting out the aqueous phase. As indicated hereinbefore, the main and most important advantage in the use of such normally liquid organic compounds in the formation of a dispersed phase is their recoverability by distillation after they have served their function in the process of particle formation.

The particular property of such liquid organic materials, especially n-hexyl Cellosolve, that permits them to function as an organic dispersed phase during the particle-forming, specifically bead-forming, process is not due to the solubility of such an organic compound in water. Instead, such compounds are believed to be operative in practicing this invention because of the solubility of water in it, and the lack of solubility of the organic compound in water together with a possible (and perhaps probable) solubility relationship between the inorganic hydrosol, specifically siliceous hydrosol, and the said organic compound constituting the dispersed phase. This solubility relationship is probably achieved with Tergitol NPX and similar surfactants as a result of the effects of temperature and, also, the concentrations of acid and salt in the reaction mass.

With further reference to the normally liquid organic compounds that are useful in the formation of a dispersed phase and their relationship with water, it may here be mentioned that isopropanol is completely miscible with pure water in all proportions; while pure water is soluble in n-hexyl Carbitol to the extent of about 56.3%, in n-hexyl Cellosolve to the extent of about 18.8%, and in 2-ethyl-1,3-hexanediol to the extent of about 11.7%. In contrast, only about 4.3% water dissolves in isophorone and about 1.4% in di-n-butyl Carbitol. All the percentages just mentioned are by weight. The solubility of all of these organic compounds in water is low (or can be made low by salting), as compared with the cited, higher solubility of water in the specified organic compound.

The minimum amount of normally liquid, organic compound that is added to the reaction mixture is related to the concentration of the siliceous hydrosol that is present in the organic phase. The amount of the organic phase and of the siliceous material should be so proportioned that sufficient silica enters the dispersed globules of the organic phase so that the silica can polymerize therein and solidify in the shape of the said globules.

Two general types or categories of products have been observed in making silica particles from water-soluble sodium silicate using various organic solvents. These may be classified as (a) hard beads and (b) organic-phase gel material. The former includes spherical and nearly spherical granular particles that are formed in suspension and which maintain their shape throughout further treatment. The silica beads obtained as described, for example, earlier in this specification using Tergitol NPX as the organic phase are in category (a). Category (b) includes finely divided materials resulting from the coagulation of the separate organic phase into a single organic-gel phase. This coagulation may occur either when agitation is stopped or when the product is filtered from the reaction mass. Category (a) products are obtained in accordance with this invention using such liquid organic compounds or reaction media as, for example, n-hexyl Cellosolve, n-hexyl Carbitol, n-butanol, and isopropanol as the organic phase, and proportions of system components such as will render silica polymerization very rapid. These siliceous products are, in general, characterized by low mean pore diameters of about 20–30 A. and high surface areas (BET) of the order of 700 to 1100 square meters per gram. An exception to this generalization has been one category (a) product which, upon testing, was found to have a surface area of the order of 200 square meters per gram.

Category (b) products include those made utilizing such liquid organic compounds as are employed in the production of the category (a) products, as well as organic compounds having a somewhat lower degree of solubility of water in them (e.g., isophorone, di-n-butyl Carbitol, which is diethylene glycol di-n-butyl ether, and 2-ethyl-1,3-hexanediol), and using proportions of system components such as will render silica polymerization less rapid than in the production of the aforementioned category (a) products. The siliceous products of this category are generally characterized by being irregularly-shaped particles or agglomerates thereof. The fundamental particles in the category (b) products are 10 microns or less in size. The silicas of this category have higher mean pore diameters and lower surface areas than those of category (a). In contrast to the category (a) products, their mean pore diameters generally range from about 70 to about 350 A. while their surface areas (BET) are, in general, within the range of from about 300 to about 600 square meters per gram.

Water is generally more soluble in the organic liquid reaction media used in obtaining the siliceous products of category (a) than it is in making the siliceous materials of category (b). For the most part, this higher water-solubility is required to produce category (a) materials only insofar as the concentration of silicic acid in the organic phase will affect the rate of silica polymerization. However, it is also a requirement that, in order to produce category (a) products, there should be sufficient silicic acid present in the organic phase to mechanically (physically) maintain the shape of the dispersed droplet upon polymerization.

It is to be understood by the above descriptions of corresponding liquid organic compounds and product categories that these relationships exist at or near room temperature (20°–30° C.); and that it is fully anticipated that a change in the reaction temperature (e.g., from above room temperature to about or immediately below the boiling point of the reaction mix at the prevailing pressure), may establish suitable solubility relationships with the aforementioned and similar organic compounds to produce siliceous materials of either category (a) or (b). The previously cited production of category (a) material by the use of Tergitol NPX as the liquid organic reaction medium is an example of temperature effect.

GENERAL PROCEDURE

The following is typical of the general procedure followed in producing siliceous materials in accordance with this invention:

The required amounts of polymerization catalyst, aqueous acid solution, salting agent (if included as a system component), and liquid organic reaction medium are mixed in a vessel provided with agitating means. When the reactor contents have been well mixed and the salting agent (preferably also the polymerization catalyst) is in solution, the desired amount of water-soluble sodium silicate in the form of an aqueous solution thereof is added slowly, so as to avoid local high concentrations, with continued steady agitation. The agitation must be sufficient to disperse and maintain the dispersion of the organic phase that is present. The order of charging feed material (exclusive of salting agent) to the reactor is only critical in that the sodium silicate solution must be added last. In some cases (see, for instance, Example 3), the salting agent may be added last.

The temperature of mixing is preferably the ambient temperature, but as previously has been indicated, mixing may be carried out under heat at temperatures up to approximately, or immediately below, the boiling point of the mixture at the prevailing pressure, e.g., at from about 40° or 45° C. to 90° or 95° C., or even 99° C.

Within a period (e.g., from 1 minute to 1 hour or more) after the sodium silicate solution has been added, the silica polymerization product forms. The silica product in bead or other particle form is then separated from the reaction mix, e.g., by filtration. The isolated solid product may next be washed in a conventional way, e.g., with normal or hot water, to remove residual sodium salt; or it may be washed after a subsequent ignition step. The washed or unwashed siliceous product is then subjected to heat and/or vacuum to remove water and the volatile organic material. The substantially water- and organic-free siliceous material may then be ignited, e.g., at from about 400° C. to a temperature just below the sintering temperature of the silica, to remove the last traces of volatile material. The ignited silica product is then washed to remove residual sodium salt if this was not previously done. It is to be understood, of course, that the extent to which any of these product-treatment steps is continued will depend, for example, upon the intended use of the product.

The ranges of the proportions, and hence the ratios, of the different components and the temperatures required to produce a desired product vary with the particular organic phase that is employed. These conditions are best determined, as will be readily understood by those skilled in the art, by limited experimentation with the particular liquid organic components in question.

The determination of proper conditions to produce a desired bead product with organic components other than those specifically cited is a matter of matching silica polymerization rate with interphase solubility properties as well as degree of agitation and interphase density relationships. Since all of the variables involved have effects which are necessarily interdependen, the predicted effect of any one variable must take into account the context in which it operates. An attempt will be made to describe the general effects of the variables involved and what is observed experimentally as the particle-making, specifically bead-making, range is approached.

The variables involved are acid concentration, polymerization catalyst concentration, salt concentration (if salt is present), silica concentration, and temperature. The acid concentration affects the polymerization rate and probably also the hydrogen-bonding properties of the solvent. The salt concentration, in some cases, is responible for the presence of the organic component as a separate and therefore dispersible liquid phase, viz., in the case of isopropanol, and generally affects the interphase solubility properties. The presence of salt also increases the silicic acid polymerization rate. The polymerization catalyst, such as $Na_2SiF_6$, of course speeds the silicic acid polymerization rate. Increased silica concentration tends to increase the polymerization rate. Increased temperature, as well as affecting solubility and density relationships, also increases the polymerization rate.

If the silicic acid polymerization rate is too slow, or if there is insufficient organic phase present to contain all of the silicic acid, or if the organic compound is too soluble in the aqueous phase (as with insufficient salting or with improper mutual solubility properties), polymerization is experienced in both the organic and the aqueous phases. Polymerization must take place solely in the organic phase to produce category (a) materials. If the polymerization rate is too rapid and the hydrogen-bonding tendency of the solvent very strong, the organic phase and silicic acid may coagulate as a single, large, semi-solid phase suspended in the aqueous medium. If too large a quantity of the organic phase is used (when interphase solubility properties are correct) so that the silicic acid concentration in the organic phase is low, polymerzation will be slowed, and setting of the dispersed bead shapes will take an extended period of time if it occurs at all.

The rate of agitation of the reaction mix, as well as the interphase density and viscosity relationships, affect the size of the dispersed-phase (organic-phase) droplets and, therefore, the size of the resulting bead particles. A higher degree of agitation generally produces a finer bead size. Attention is directed to the publication of Rodger, Trice and Rushton, Chemical Engineering Progress 52, No. 12, pp. 515–520 (December 1956), for a discussion of the effect of agitation and interphase properties on the size of dispersed-phase droplets in a two-liquid-phase system. One skilled in the art may then readily use the guides outlined herein to produce a bead material within the teaching of this invention with any hydrogen-bonding agents with which proper solubilty relationships between it and water exist or can be made to exist by salting or temperature effects.

When n-hexyl Cellosolve is the organic component, the following preferred procedure, wherein all parts and percentages are by weight, is applicable for the formation of category (a) silica particles:

Two (2) parts $Na_2SiF_6$, 375 parts 10% aqueous $H_2SO_4$ and 50 parts n-hexyl Cellosolve are added to a reaction vessel provided with agitation means. The reaction is carried out with agitation at about 25° C. When the $Na_2SiF_6$ has all dissolved, the addition of 120 parts of an aqueous solution of sodium silicate composed essentially of 6.32% $SiO_2$:1.75% $Na_2O$ is begun. The addition may be made over as short a time as is consistent with maintenance of batch uniformity but must be completed before the reaction proceeds to the bead-forming stage. Within 5 to 6 minutes after the addition has been completed, beads begin to appear in the reaction mix. At the end of the reaction period, e.g., within from 10 to 60 minutes after the addition of the sodium silicate solution, the beads may be separated (e.g., by filtration, centrifuging, etc.) from the reaction mix, normally yielding a substantially aqueous phase. The remaining steps in the process are the same as have previously been described with reference to the general procedure.

There is a relatively narrow range of mix-component ratios that will produce category (a) siliceous particles when n-hexyl Cellosolve is the organic component.

In the description of this range, it should be remembered that there are many variables involved. These variables include, for example, temperature, amounts of excess acid, fluoride, and salting agent that are present, and the relation between the amount of solvent (i.e., liquid organic reaction medium) and the amount of silica that is present in the feed. Each of these variables affects not only the rate of silica polymerization but also the solubility relationships of the organic and aqueous phases. Furthermore, the effects are not necessarily in the same direction or, for that matter, the same for one variable for differing values of the other variables. Therefore, an infinite number of "matched" sets of these variables could be specified, where it would be necessarily meaningless to describe ranges for each variable separately.

The following more detailed description is applicable at room temperature or approximately 25° C. where the primary variables are defined specifically as F, C, and S wherein $$F = \frac{\text{g. equivalents of flouride}}{\text{liters of aqueous feed}}$$

$$C = \frac{\text{g. equivalents of excess acid}}{\text{liters of aqueous feed}}$$

and $$S = \frac{\text{grams of } SiO_2 \text{ in feed}}{\text{liters of solvent (organic solvent) in feed}}$$

By the term "feed" is meant the total reaction mix. By the term "aqueous feed" is meant the total ingredients added to the reaction mix except for the liquid organic reaction medium. Excess acid is defined as acid, other than the silicic acid that is present, which is over and above that which is equivalent to the value of $Na_2O$ in the sodium silicate feed.

Taking n-hexyl Cellosolve as a specific example of the liquid organic component employed in the reaction mix, it may be stated that when this organic compound is employed category (a) siliceous products in bead or bead-like form are obtained when the values for F, C, and S in the above equations are as follows:

$F = > 0.04$, e.g., up to about 0.2
$C = 1.2$ to $1.7$
$S = 130$ to $330$

The use of values of F greater than about 0.2 usually exceeds the solubility limit of the fluoride or fluosilicate additive and does not add to the performance of the system.

The additional variable of salting agent concentration has a variable effect and can change the product from one category to another depending upon the values of the other variables. For instance, at $F=0.14$, $C=1.7$, and $S=160$, the addition of 1.6 moles NaCl per liter of aqueous feed does not affect the product category, viz, category (b), at all. However, at $F=0.14$, $C=1.6$, and $S=268$, the addition of the same amount of NaCl changes the product, which is obtained as a category (b) product in the absence of NaCl, from category (b) to category (a).

In contrast to the production of category (a) siliceous materials there are relatively larger ranges of the defining variables that can be employed to produce category (b) materials when n-hexyl Cellosolve is the organic component. However, in making category (b) materials, an additional requirement of ready processability must be considered. In other words, the use of certain extremes of defining variable values, although ultimately (i.e., upon drying) producing a category (b) material may do so with the formation of an intermediate product or organic-gel phase that is difficult, time-consuming and, therefore, costly to separate from the liquid reaction medium.

Again, in describing the category (b) range, it must be understood that the variables have interactions similar to those for category (a) materials. Category (b) product may be produced at approximately 25° C. when the values for C, S, and F in the foregoing equations are as follows:

$C=0$ to about 7, and preferably to about 3 or 4
$S=20$ to about 330
$F=0$ to a small positive value not exceeding 1.0, and preferably not exceeding about 0.2, e.g., from 0.04 to about 0.2.

It will be understood, of course, that the foregoing values exclude that area of variable values defined for use in producing the category (a) product. The lower extremes of values of C, S, and F will be accompanied by reaction periods considerably longer than the 10 to 60 minutes associated with the production of the category (a) product.

Preferred ranges of values employed in making the category (b) siliceous material when n-hexyl Cellosolve is the organic component are as follows:

$C=1.0$ to $3.0$
$S=130$ to $330$
$F=>0.02$ again excluding the variable values defined for use in preparing the category (a) siliceous materials. The most preferred range within these ranges is that which will provide most ready processability of the product.

Although the preceding descriptions relating to variables and ranges thereof in producing category (a) and (b) materials are based on preparations that were made at room temperature (about 25° C.), it is obvious that other temperatures (both above and below about 25° C.) would be operative by using components that would provide a suitable combination of aqueous-organic solvent solubility properties, and the rate of silica polymerization achieved by a proper adjustment of the other variables. Such variations of temperature and corresponding changes in the aforementioned ranges of the variables obtained by effecting the reactions at about 25° C. are within both the spirit and scope of the instant invention.

It is not essential that one use sodium fluosilicate as the source of the fluoride ion. Thus, as indicated hereinbefore, one also may use potassium and/or other alkalimetal fluosilicates. Other water-soluble fluosilicates that are useful are ammonium fluosilicate and such fluosilicates as $MnSiF_6 \cdot 6H_2O$, $NiSiF_6 \cdot 6H_2O$, and $MgSiF_6 \cdot 6H_2O$. Hydrofluoric acid, fluosilicic acid, and other inorganic acids containing fluorine in the molecule are also useful. water-soluble, fluorine-containing compounds that decompose either slowly or rapidly in water also can be employed, e.g., titanium trifluoride or tetrafluoride, tin tetrafluoride, and tungsten hexafluoride, all of which disperse in water to liberate the metal constituent and hydrofluoric acid. The liberated acid then acts as a polymerization or gelation catalyst. Any of the water-soluble inorganic fluorides are also useful as the source of the fluoride ion in practicing this invention, for example, the fluorides of copper, potassium, silver, sodium, tin, vanadium, and zinc. Ammonium fluoride is also useful. Sodium hydrogen fluoride, potassium hydrogen fluoride, ammonium hydrogen fluoride, and other acid fluorides corresponding to the aforementioned and other water-soluble inorganic fluorides also may be used as the source of the fluoride ion. A single source or a plurality of different sources of the fluoride ion can be employed.

The amount of fluorine-containing compound that is used as a polymerization catalyst may be varied considerably but in all cases is a catalytic amount. The exact amount will depend upon such influencing factors as, for example, the particular fluorine-containing compound and organic component that are used and the temperature of operation.

In order that those skilled in the art may better understand how the present invention can be carried into effect, the following examples are given by way of illustration and not by way of limitation. All parts and percentages are by weight unless otherwise stated.

EXAMPLE 1

A 6-inch diameter vessel was fitted with four vertical 0.6-inch (i.e., 10%) baffles. Agitation was provided by the use of a 4-bladed, turbine-type agitator, 2 inches in diameter, at 900 r.p.m. To the vessel were added 1600 parts of a 10% aqueous solution of $H_2SO_4$, 8 parts $Na_2SiF_6$, 180 parts of n-hexyl Cellosolve, and 530 parts of an aqeuous solution of water-soluble sodium silicate composed essentially of 6.32% $SiO_2$:1.75% $Na_2O$. The whole mix was at 25° C. (room temperature). In less than 10 minutes after completion of the addition of the soidum silicate solution, which was added last, silica beads were formed. After an additional elapsed time of 20 minutes, agitation was stopped and the beads were separated from the reaction mix by filtration and water-washed to remove sodium salts.

The isolated and washed beads were subjected to heat at reduced pressure in order to recover the volatile (volatilizable) organic material contained therein. A majority of the organic component was recovered at 105° C. and 0.5 mm. Hg pressure absolute. The beads were ignited at 500° C. to remove the last traces of the organic component that was present. An actual yield of 82%, based on the amount of $SiO_2$ in the sodium silicate fed to the reactor, was achieved. The resulting beads were substantially spherical particles ranging in diameter from about 150 to about 500 microns. These beads had a surface area (BET) of about 890 meters$^2$/gram and a pore volume by water titration of 0.52 cc./gram.

EXAMPLE 2

The vessel, agitation, and mix components and proportions were the same as in Example 1 with the exception that n-hexyl Carbitol was used in place of n-hexyl Cellosolve. However, in this example the solid beads formed in less than 7 minutes after completing the addition of the sodium silicate solution but were not completely hardened at the end of this time period.

After separation from the reaction mix by filtration, the beads were washed as in Example 1. The product was similar to that of the previous example but showed a pore volume, by $CCl_4$ adsorption, of 0.62 cc./gram. The actual yield of silica beads (approximately spheroidal particles) was more than 95% based on the amount of $SiO_2$ in the sodium silicate charged to the reaction vessel.

EXAMPLE 3

The vessel and the agitation were the same as in Example 1. To the vessel were added 650 parts of a 10% aqueous solution of $H_2SO_4$, 278 parts of water, 355 parts of isopropanol, 4 parts of $Na_2SiF_6$, 1120 parts of an aqueous solution of sodium silicate which was 10.52% $SiO_2$:2.91% $Na_2O$, and 510 parts of NaCl (salting agent) in respective order. The sodium silicate solution was added steadily over a 3-minute period to avoid local high concentrations. The NaCl was added immediately after the addition of the sodium silicate solution had been completed. As in Examples 1 and 2, the reaction mix was at room temperature (about 25° C.). Solid beads formed in less than 7 minutes after completion of the sodium silicate addition but were not completely hardened yet. After an additional elapsed time of 63 minutes, agitation was stopped and the beads were separated from the reaction mix by filtration. The isolated beads were washed with five portions of 2000 parts each of water, and filtered to separate the washed beads from the washings.

The major proportion of the isopropanol was removed from the beads by heating at 90° C. at atmospheric pressure. The beads were ignited at 500 C. to remove the last traces of isopropanol and water. The actual yield of silica beads was 92% based on the amount of $SiO_2$ in the sodium silicate fed to the reactor. These beads were substantially spherical in shape and had a diameter ranging from about 10 to about 80 microns. They have pore volume, by $CCl_4$ adsorption, of 0.35 cc./gram.

EXAMPLE 4

The vessel and agitation, including temperature of mixing, were the same as in Example 1. To the vessel were added, in respective order, 16 parts $Na_2SiF_6$, 1140 parts of a 20% aqueous solution of $H_2SO_4$, 108 parts n-butanol, 120 parts NaCl, and 360 parts of an aqueous solution of sodium silicate which was 6.32% $SiO_2$:1.75% $Na_2O$. The sodium silicate solution was added steadily over a 7-minute period to avoid local high concentrations. By the time addition of the latter solution had been completed, beads had already formed in the reaction vessel. Forty minutes later agitation was stopped, and the beads were separated from the mix by filtration.

The majority of the n-butanol was removed from the beads by heating at 120° C. at atmospheric pressure. The beads were ignited at 500° C. to remove the last traces of water and n-butanol. The actual yield of silica beads was 85% based on the amount of $SiO_2$ in the sodium silicate charged to the reaction vessel. The ignited material was composed of substantially spherical particles having an average diameter of about 1 micron. The material had a pore volume, by $CCl_4$ adsorption, of 0.72 cc./gram.

References for the technique employed in making the determinations for pore volume mentioned in the foregoing examples and in certain of the appended claims include "Determination of Pore Volume of Solid Catalysts," Analytical Chemistry, 27, No. 12, pp. 1963–65 (1955), H. A. Benesi, R. U. Bonnar, and C. F. Lee; and "Total Porosity and Particle Density of Fluid Catalysts by Liquid Titration," Analytical Chemistry, 28 pp. 332–334 (1956), W. B. Innes. The former reference includes a description of the $CCl_4$ method of pore volume determination and a definition of mean pore diameter. The latter reference describes the water method.

EXAMPLES 5 THROUGH 30

Further illustrations of how the present invention can be carried into effect are given in the group of examples listed in the following table and wherein are given more specific details of the conditions and an indication of the type of product obtained.

All of these preparations were made using a 100 ml. beaker as the reaction vessel with the exception of Example 29 wherein a 400 ml. beaker was used. Agitation was supplied by means of a magnetic stirrer. The concentration variables, C, F and S heretofore defined, are used in connection with the description of each example. The amount of salting, as well as the category of product, this is, (a) or (b), is also indicated.

In all cases the tests were carried out by agitating the reaction mix at room temperature or approximately 25° C. The acid solution, $Na_2SiF_6$, organic solvent, and salt were added in that order, and the sodium silicate solution was added last. In each example the product was recovered by filtration. In the cases where indicated, the product was washed with the designated portions of water using approximately 20 parts water per part silica for each portion of wash. Further treatment depended upon the object of each individual test, and was unimportant in determining product category.

The table follows.

| Ex. | Organic component | Category of product | Portion of wash | C[1] | F[2] | S[3] | Salting[4] |
|---|---|---|---|---|---|---|---|
| 5 | n-Hexyl Cellosolve | a | 0 | 1.4 | .07 | 160 | 1.6 |
| 6 | do | a | 2 | 1.4 | .21 | 160 | None |
| 7 | do | a | 0 | 1.4 | .14 | 160 | 1.6 |
| 8 | do | a | 0 | 1.6 | .14 | 268 | 1.6 |
| 9 | do | b | 0 | 1.0 | .14 | 160 | None |
| 10 | do | b | 0 | 2.8 | .07 | 268 | None |
| 11 | do | b | 0 | 2.2 | .14 | 160 | None |
| 12 | n-Hexyl Carbitol | a | 2 | 1.5 | .16 | 152 | None |
| 13 | Isopropanol | a | 3 | .19 | .09 | 400 | 5.5 |
| 14 | do | a | 0 | .19 | .09 | 230 | 5.5 |
| 15 | do | b | 2 | .19 | .09 | 700 | 5.5 |
| 16 | do | b | 2 | 1.9 | .07 | 120 | 5.5 |
| 17 | do | a | 0 | 3.5 | .55 | 152 | 1.9 |
| 18 | do | a | 0 | 5.9 | .20 | 152 | None |
| 19 | do | a | 0 | 5.9 | .60 | 152 | 2.1 |
| 20 | do | b | 0 | 1.5 | .16 | 152 | None |
| 21 | do | b | 0 | 3.5 | .18 | 152 | 1.9 |
| 22 | do | b | 0 | 3.5 | .27 | 152 | 3.7 |
| 23 | do | b | 0 | 1.5 | .50 | 152 | 1.7 |
| 24 | do | a | 0 | 5.9 | .20 | 228 | None |
| 25 | do | b | 0 | 3.5 | .27 | 250 | 1.9 |
| 26 | Isophorone | b | 4 | 1.4 | .07 | 310 | None |
| 27 | do | b | 3 | 2.3 | .38 | 180 | None |
| 28 | do | b | 1 | 2.0 | .96 | 320 | None |
| 29 | Di-n-butyl Carbitol | b | 3 | 1.5 | .08 | 300 | 5.5 |
| 30 | 2-ethyl-1,3-hexanediol | b | 0 | 3.5 | .20 | 150 | None |

[1] G. equiv. excess acid/liters of aqueous feed.
[2] G. equiv. of fluoride/liters of aqueous feed.
[3] Grams $SiO_2$ in feed /liters of solvent in feed.
[4] G. equiv. salt/liters of aqueous feed.

EXAMPLE 31

This example illusrates the advantage gained in reaction time by the use of a fluoride polymerization catalyst, specifically $Na_2SiF_6$, and wherein the organic phase (specifically Tergitol NPX) is non-recoverable and not embraced by the invention claimed in this application.

Two comparable runs were made, one with and one without a fluoride polymerization catalyst. In each case a 400 ml. beaker was used as the reaction vessel, and agitation was provided by a 3-bladed propeller-type agitator rotating at 440 r.p.m. Also, in each case 19 parts of Tergitol NPX was added to 160 parts of a 10% aqueous solution of sulfuric acid. Likewise, in each run 53 parts of an aqueous solution of sodium silicate composed essentially of 6.32% $SiO_2$:1.75% $Na_2O$ was added dropwise over a 7-minute period. Each mix was heated to 85° C., at which time 10 parts of NaCl was added. After an elapsed time of 10 minutes from the first NaCl addition, 10 more parts NaCl was added.

In case (1) agitation was stopped 10 minutes after the second NaCl addition, and no beads were present. Silicic acid had only partially polymerized in the organic (Tergitol NPX) phase, and it was semi-fluid.

In case (2), 12 milligrams of $Na_2SiF_6$ was added 4 minutes after the second NaCl addition. Agitation was stopped 10 minutes after the second NaCl addition, and a category (a) bead product that had formed was recovered by filtration.

EXAMPLE 32

This example illustrates the advantage gained in the yield of beads by the use of a fluoride polymerization catalyst, and wherein the organic phase was the same as in Example 31.

The apparatus, procedure and recipe were the same as that of Example 31 with the following exceptions:

(1) in all six runs that were made 10 parts Tergitol NPX was used instead of 19 parts;

(2) in three of the six runs 0.0012 parts of $Na_2SiF_6$ was added one minute after the second NaCl addition;

(3) in all six runs agitation was stopped and the product beads were isolated by filtration 10 minutes after the second NaCl addition; and (4) in all six runs the beads were washed with five successive 40-part portions of water, dried and then ignited at 500° C.

The three runs in which a polymerization catalyst, $Na_2SiF_6$, was used showed an average yield of 84.4% while the three runs without a polymerization catalyst showed an average yield of 75.2%.

It will be understood, of course, by those skilled in the art that my invention is not limited only to the specific ingredients, proportions thereof, operating conditions including time and temperature, and solvent-removal and ignition techniques given in the foregoing examples by way of illustration. For instance, instead of using water glass as the source of the $SiO_2$, one may use sodium ortho-silicate; or, any other alkali-metal silicate embraced by the general formula $xR_2O \cdot ySiO_2$ wherein R represents an alkali metal and $x/y$ is greater than 0.24. Also, instead of employing sodium fluosilicate as the source of the fluoride ion, one may use any other water-soluble compound containing or engendering a fluoride ion, which is useful as a polymerization catalyst in practicing this invention, numerous examples of which compounds have been given hereinbefore.

Although sulfuric acid is the preferred acid for inclusion in the reaction system or mix, it is not essential that only sulfuric acid be used. Other acids (both organic and inorganic) may be used in lieu of $H_2SO_4$, e.g., hydrochloric acid, nitric acid, phosphoric, chlorosulfonic acid, acetic acid, oxalic acid, di- or trichloroacetic acids, benzenesulfonic acids, and the like. In selecting the organic or inorganic acid for use in a particular system one should avoid any acid which, at the concentrations employed, reacts or tends to react with the organic component of the system.

Likewise, salting agents (sometimes designated as "salting-out" agents) other than sodium chloride may be employed, for instance any of the other alkali-metal (or other water-soluble) halides. In general, suitable salting agents that may be used in practicing this invention are water-soluble salts of (a) inorganic cations such as sodium, potassium, lithium, ammonium, and the like, and (b) anions of mineral or lower aliphatic acids such as chloride, fluoride, bromide, sulfate, nitrate, phosphate, acetate, propionate, and the like. Specific examples of such salting agents, in addition to sodium chloride that was used in examples wherein such an agent was employed, are sodium sulfate, potassium chloride, sodium nitrate, sodium acetate, ammonium chloride, ammonium sulfate, lithium nitrate, potassium propionate and the like. Advantageously there may be used salts of monovalent cations, e.g., the alkali-metal and ammonium ions, and the anions of mineral acids or lower alkanoic acids. Mixtures of water-soluble salts can also be used as the salting agent. Preferably sodium chloride is employed.

From the foregoing description it will be seen that the present invention provides a method of producing silica particles of two different types, viz, Types (a) and (b) hereinbefore described, and either of which may be obtained as desired or as may be required to meet a particular service application.

In its broader aspects the invention includes the steps of (I) providing a reaction system or mixture containing
  (A) a polymerizable hydrosol comprised or consisting essentially of silica derived from an alkali-metal silicate, specifically sodium silicate, and
  (B) a recoverable (e.g., by distillation), liquid, organic, reaction medium capable of providing a dispersed phase in which the said hydrosol is soluble and wherein it continues to polymerize to yield hydrogel particles comprised or consisting essentially of silica and from which are obtainable silica particles of Types (a) and (b), and
(II) agitating the aforesaid reaction system until a hydrogel has been obtained, by polymerization of the said polymerizable hydrosol, in the form of particles comprised or consisting essentially of silica and from which are obtainable silica particles of Types (a) or (b).

The primary variables in the preparation of the aforesaid silica particles of Types (a) or (b) have been hereinbefore defined as C and S, and also by F when the reaction system includes a catalytic amount of a fluoride ion as a polymerization catalyst. The equations or definitions indicating how the values for C, S and F are derived also previously have been given, together with minimum and maximum ranges of values for C, S and F and within which either the Type (a) or Type (b) silica products are obtainable.

The reaction system is further characterized by the fact that by introducing a variable concentration, from zero to a positive amount, of a salting agent (numerous examples of which hereinbefore have been recited) to the system one can produce Type (a) product or, alternatively, at different values for C, S and F but at or within the hereinbefore-given what would otherwise result in a Type (b) product into a Type (a) product.

One of the most important and valuable advantages of the instant invention accruing from the use of a volatile (volatilizable), liquid, organic, reaction medium of the kind exemplified by n-hexyl Cellosolve, n-hexyl Carbitol and di-n-butyl Carbitol (among others hereinbefore specifically identified) is the fact that they are recoverable (e.g., by distillation) from the reaction mass in which the hydrogel particles have been formed. The economic benefits attained by thereby lowering operating costs when the liquid, organic, reaction medium is recovered will be fully appreciated by those skilled in the art.

Accordingly, the method features of the present invention optionally, but most advantageously, include the additional step or steps of recovering this liquid organic component from the reaction mass at the end of the reaction period. Thus, in addition to broad or primary steps I and II hereinbefore identified, the method may include the additional steps of isolating (e.g., by filtration, centrifuging, etc.) the silica hydrogel particles from the recoverable, liquid, organic, reaction medium; recovering the said liquid reaction medium, e.g., by distillation; and igniting the isolated particles to remove any remaining organic material contained therein. Washing of the isolated silica hydrogel particles, e.g., with water, may be effected either before or after the ignition step.

In some cases, e.g., when the organic solvent is relatively low boiling (i.e., below the boiling point of water as is isopropanol), it may be economically advantageous to also recover the organic solvent from the water washings. Or, if the organic solvent is very expensive, in such cases it may be economically desirable to recover the said solvent from the washings by evaporating or distilling off the wash fluid, leaving the organic solvent as a residue.

The scope of the present invention obviously is not limited, nor is it intended to be limited, only to the particular organic solvents given hereinbefore by way of illustration. Other recoverable organic solvents contemplated as being useful, because of their natural solubility properties or because of the properties that are obtainable by proper salting of the reaction medium, include ethyl-3 formyl propionate, the dimethyl ether of tetraethylene glycol and, for example, other members of the alkylene glycol or alkylene glycol-type of volatilizable (or otherwise recoverable), organic solvents that under the proper conditions of temperature, salting and other influencing factors can be employed in making silica particles in accordance with the teachings of this invention.

A swill be evident to those skilled in the art, modifications of this invention can be made or followed in the light of the foregoing disclosure without departing from the spirit and scope of the disclosure or from the scope of the claims.

Thus, it will be apparent to those skilled in the art that the principles on which this invention is based are applicable to the production of inorganic oxide hydrosols or gels other than the solely siliceous hydrosols or gels and, more particularly, to any hydrosol or gel comprising at least one inorganic oxide, numerous examples of which are given in the aforementioned Elam Patent No. 2,516,967 (column 5, line 67, to the end of the sentence in line 28, column 6). Such inorganic oxide hydrosols or gels include, for example, those in which the solids consist essentially or silica-alumina, titania, zirconia, beryllia, ferric oxide, magnesium oxide, magnesium hydroxide, aluminum hydroxide, etc., and mixtures of such materials in any proportions, and more particularly in proportions such as those mentioned in the aforementioned Elam patent. They include mixtures of silica with different inorganic oxides, examples of which latter have been given above and in the aforesaid Elam patent.

I claim:

1. A method of producing silica particles which comprises:
  (a) forming a reaction mix comprising: a polymerizable hydrosol comprised of silica derived from an alkali-metal silicate, an organic reaction medium which forms a dispersed phase in said reaction mix and in which said hydrosol is soluble, and a catalytic amount of a fluoride ion; and
  (b) polymerizing said hydrosol in said dispersed phase to form silica particles.

2. A method of producing silica particles according to claim 1 wherein said organic reaction medium consists essentially of a liquid, organic reaction medium which is recoverable by distillation.

3. A method according to claim 1 wherein said reaction mix also includes a salting agent.

4. A method according to claim 1 which includes the step of agitating said reaction mix at a sufficient rate to maintain the dispersion of said dispersed phase and for a sufficient period of time to effect said polymerization.

5. A method according to claim 1 wherein said organic reaction medium is selected from the group consisting of ethylene glycol mono-n-hexyl ether, diethylene glycol mono-n-hexyl ether, isopropanol, n-butanol, isophorone, 2-ethyl-1,2-hexanediol, and diethylene glycol di-n-butyl ether.

6. A method according to claim 1 wherein said hydrosol is formed by admixing an aqueous solution of an acid with a water-soluble alkali-metal silicate.

7. A method according to claim 6 wherein said alkali-metal silicate is a sodium silicate.

8. A method according to claim 2 wherein said reaction mix is formed by first agitating a liquid reaction mass comprising an aqueous solution of an acid, a water-soluble fluorine compound in an amount sufficient to provide a catalytic amount of a fluoride ion, and said organic reaction medium; and thereafter adding to said reaction mass with continued agitation sufficient to maintain the dispersion of said dispersed phase, an aqueous solution of a water-soluble alkali-metal silicate.

9. A method of producing silica particles according to claim 8 wherein the primary variables of said method are C, S, and F; wherein:

$$C = \frac{\text{gram equivalents of excess acid}}{\text{liters of the ingredients added to form said reaction mix except for said liquid organic reaction medium}}$$

$$S = \frac{\text{grams of SiO}_2 \text{ in reaction mix}}{\text{liters of liquid organic reaction medium in reaction mix}}$$

$$F = \frac{\text{gram equivalents of fluoride}}{\text{liters of the ingredients added to form said reaction mix except for said liquid organic reaction medium}}$$

and wherein "excess acid" in C is defined as the acid, other than that acid derived from the alkali-metal silicate, that is over and above the amount which is equivalent to the value of the alkali-metal oxide in the alkali-metal silicate employed.

10. A method according to claim 9 wherein said liquid, organic reaction medium is ethylene glycol mono-n-hexyl ether, and $C = 1.2$ to $1.4$
$S = 130$ to $330$
$F = >0.04$ to $0.2$ said silica particles so formed being hard, substantially spherical, silica particles characterized by mean pore diameters of about 20 to 30 A. and surface areas (BET) of about 700 to 1100 square meters per gram.

11. A method according to claim 9 wherein said liquid, organic reaction medium is ethylene glycol mono-n-hexyl ether, and wherein said polymerization occurs at 25° C., and $C = 0$ to about 7
$S = 20$ to about 330
$F = 0$ to a small positive value not exceeding 1.0 and the particles formed are irregularly shaped particles having a particle size of less than about 10 microns and characterized by mean pore diameters from about 70 to about 350 A. and by surface areas (BET) of from about 300 to about 600 square meters per gram.

12. A method according to claim 11 wherein said recoverable, liquid, organic reaction medium is ethylene glycol mono-n-hexyl ether, and $C = 1.0$ to $3.0$
$S = 130$ to $330$
$F =$ greater than $0.02$.

13. A method according to claim 1 wherein the source of said fluoride ion is $Na_2SiF_6$.

14. A method of producing silica particles according to claim 2 wherein said reaction medium comprises a volatile liquid organic compound.

15. A method according to claim 14 which also includes the steps of collecting said silica particles, separating said particles from said volatile liquid organic compound and recovering said compound.

16. A method according to claim 15 wherein said compound is recovered by distillation.

17. A method according to claim 14 wherein said admixture is formed by initially agitating a reaction mass comprising an aqueous solution of an acid and said recoverable liquid, organic reaction medium, and thereafter, with continued agitation sufficient to maintain the dispersion of said dispersed phase, adding to said reaction mass an aqueous solution of a water-soluble alkali metal silicate; and including the steps of continuing said agitation until said silica particles are formed, separating said silica particles from said volatile liquid organic compound, collecting said particles, and recovering said volatile liquid organic compound.

18. A method according to claim 17 wherein said liquid organic compound is selected from the group consisting of ethylene glycol mono-n-hexyl ether, diethylene glycol mono-n-hexyl ether, isopropanol, n-butanol, isophorone, 2-ethyl-1,3-hexanediol, and diethylene glycol di-n-butyl ether.

19. A method according to claim 18 wherein said alkali metal silicate is a sodium silicate.

References Cited

UNITED STATES PATENTS 2,408,656  10/1946  Kirk _____ 23—182 X
3,258,311   6/1966  Burzynski et al. _____ 23—182

OTHER REFERENCES

Iler, "The Colloid Chem. of Silica and Silicates" (1955), pp. 160 and 161 relied on.

OSCAR R. VERTIZ, Primary Examiner

S. B. SHEAR, Assistant Examiner

U.S. Cl. X.R.

252—448